United States Patent [19]

Dobreski

[11] 4,430,457

[45] Feb. 7, 1984

[54] CLING/STRETCH WRAP COMPOSITIONS

[75] Inventor: David V. Dobreski, East Windsor, N.J.

[73] Assignee: Cities Service Company, Tulsa, Okla.

[21] Appl. No.: 376,892

[22] Filed: May 10, 1982

[51] Int. Cl.³ .............................................. C08K 5/13
[52] U.S. Cl. .................................. 523/100; 523/101; 524/351; 524/352; 525/222; 525/240
[58] Field of Search ............... 523/100, 101; 525/222, 525/240; 524/351, 352

[56] References Cited

U.S. PATENT DOCUMENTS

| | | | |
|---|---|---|---|
| 3,700,753 | 10/1972 | Terada et al. | 525/240 |
| 4,123,417 | 10/1978 | Finberg | 525/240 |
| 4,222,913 | 9/1980 | Cooper | 525/222 |
| 4,309,332 | 1/1982 | Fischer et al. | 525/222 |
| 4,311,808 | 1/1982 | Su | 525/222 |
| 4,359,495 | 11/1982 | Schroeder et al. | 525/222 |
| 4,359,553 | 11/1982 | Edwards | 525/240 |
| 4,367,256 | 1/1983 | Biel | 525/240 |
| 4,387,185 | 6/1983 | Schroeder et al. | 525/222 |
| 4,390,666 | 6/1983 | Moriguchi et al. | 525/240 |

FOREIGN PATENT DOCUMENTS

3003658AI 8/1981 Fed. Rep. of Germany.

*Primary Examiner*—Veronica P. Hoke
*Attorney, Agent, or Firm*—George L. Rushton

[57] ABSTRACT

A cling/stretch wrap film having desirable processing and end use characteristics is made from a composition of 90–97.5 wt. % an ethylene polymer having a melt flow value between 0.2 to 6.0 such as EVA copolymer (4–5 wt. % VA content) and 2.5–10 wt. % low density amorphous copolymer of ethylene and propylene (about 3–5 wt. % ethylene).

5 Claims, No Drawings

CLING/STRETCH WRAP COMPOSITIONS

BACKGROUND OF THE INVENTION

This invention relates to polymeric films. More particularly, the invention concerns polymeric films having properties that make the film useful for cling wrap film, such as that used for wrapping pallet loads of various materials.

Known polymeric materials used for cling (also known as stretch) wrapping of palletized loads include polyvinyl chloride, polyethylene, and ethylene-vinyl acetate copolymers. U.S. Pat. No. 4,222,913 teaches the use of a three-component blend for cling wrap formulations, the components being an ethylene-vinyl acetate copolymer as the base resin, a polypropylene copolymer added to achieve a thin film gauge, and a third component as a tackifier. The patent teaches that the ethylene-vinyl acetate and the polypropylene copolymers should have similar viscosities (for compatibility during blending) and refractive indices (for optical properties). The low molecular weight tackifier tends to bloom to the surface, giving the necessary cling properties.

Prior 2-component systems, such as low density polyethylene base resin and a glyceryl mono-oleate tackifier, show easy processing, but they typically have a low tackiness, with the tackiness failing at temperatues below about 40° F., leading to storage and customer use problems.

It is an object of this invention to produce a 2-component cling film composition that overcomes at least a majority of these deficiencies.

SUMMARY OF THE INVENTION

The present invention is a composition suitable for use as cling film, the composition comprising from about 90 to about 97.5 wt.% of an ethylene polymer selected from the group consisting of ethylene-vinyl acetate copolymers, low density polyethylene homopolymers, and linear low density polyethylene resins, and from about 2.5 to about 10 wt.% of an ethylene-propylene copolymer. Optionally, a minor amount of an antioxidant, such as BHT (butylated hydroxy toluene) or BHEB (butylated hydroxy ethylbenzene), can be added to the composition for protection against degradation during processing. Antioxidant in the amount of from about 100 to about 1000 ppm, preferably about 300–400 ppm (based on the finished film) can be added.

DESCRIPTION OF THE PREFERRED EMBODIMENTS

A major component of the composition is an ethylene polymer selected from the group consisting of ethylene-vinyl acetate copolymers, low density polyethylene homopolymers, and linear low density polyethylene resins. There are many ethylene-vinyl acetate copolymers commercially available, with varying vinyl acetate contents. I have found that an ethylene-vinyl acetate copolymer having a vinyl acetate content of from about 3.0 to about 15 wt.% of the total copolymer, (or, more narrowly, from about 3.5 to about 8 wt.%) when combined with a suitable amount of a tackifier, furnishes a useful cling wrap film. In the present invention, ethylene-vinyl acetate copolymers having approximately 92 wt.% ethylene and about 8 wt.% vinyl acetate, when mixed with a tackifier, furnish a desirable cling wrap film, while a preferred composition comprises of ethylene-vinyl acetate copolymer having from about 4 to about 5 wt.% vinyl acetate and about 95–96 wt.% ethylene.

Low density polyethylene homopolymer can also be used as the major component of this composition. There is a wide range of ethylene homopolymers available for use in this invention, with densities ranging from about 0.916 to 0.928, and with a melt index varying from about 0.2 to about 6.0. The extremes of density and melt index are characteristic of polyethylenes that are not optimum for cling wrap applications. Formulations made with ethylene homopolymers outside these ranges of density and melt index tend exhibit minimum or undesirable cling wrap performance. Low density polyethylene homopolymers are known in the polymer art and need not be discussed further here.

Linear low density polyethylene is a relatively new ethylene copolymer, but it is becoming more widely used daily. This copolymer of ethylene and 1-alkenes, such as 1-butene and 1-octene, has physical properties similar to the conventional low density polyethylene described above, but it also has excellent elongation, good tear resistance, good tensile strength, and good puncture resistance. These properties are desirable for cling/strength wrap film applications.

Broadly, the range of ethylene polymer in the composition is from about 90 to about 97.5 wt.%. More particularly, the range can vary from about 94.5 to about 97 wt.%. A preferred range is from about 95 to about 96 wt.%.

The ethylene-propylene copolymer used as a tackifier in this invention is preferably a low molecular weight amorphous copolymer in which the ethylene content varies from about 1 to about 7 wt.%, and which has a viscosity (measured at 500 sec$^{-1}$ and 380° F.) such that the ratio of the ethylene polymer viscosity to ethylene-propylene copolymer viscosity is from about 100 to about 100,000. A preferred ethylene-propylene copolymer for use in this invention is POLYPOL 19, a product of Crowley Chemical Company. This particular product has an ethylene content of about 3 to 5 wt.%. The weight % of the ethylene-propylene copolymer in the composition varies from about 2.5 to about 10. A more suitable range is about 3–5.5 wt.%, while a preferred range is about 4–5 wt.%.

Due to the tackiness of the ethylene-propylene copolymer component of the composition, I have found that the composition of the invention is best produced in final form in an extruder. One way of accomplishing this is to add the major component, the ethylene polymer, to the hopper of the extruder and then to add the desired amount of the ethylene-propylene copolymer, in melted form, to the barrel of the extruder, which has a mixing screw, to assure thorough mixing of the components before the extrusion of the final film. It has been found that if the components are dry blended, the ethylene-propylene copolymer resin has enough tackiness to form agglomerates, which lead to feeding and mixing problems in the extruder.

The addition of the optional antioxidant additive can be accomplished in any of the known ways in the art, such as by addition to the extruder hopper or by dry blending with the major component of the composition before mixing in the extruder.

The following examples illustrate the invention:

EXAMPLE 1

95 parts of a pelletized low density polyethylene film resin (LDPE), such as Cities Service EF 310 having a melt index of 2.2 and a density of 0.925, were masticated in a Banbury to a typical molten state (about one minute), and 5 parts of an ethylene-propylene copolymer (POLYPOL 19, a low molecular weight amorphous polypropylene copolymer containing about 3–5 wt% ethylene) were added, with additional mixing for a total of five minutes. The mixture was fed to a heated 2-roll mill, and the resultant sheet was cut into rectangular pieces and cooled to ambient temperature. The cooled pieces were ground to a convenient size, melted in an extruder, extruded as a strand, cooled, and pelletized. The pellets were fed to a blown film extruder (melt temperature 360° F.) to give a 1 mil-thick film. The film showed good clarity, stretch, and cling properties. The film was stretched about 20–25% in wrapping a loaded pallet, showing typical stretchability. The property of clingability was measured by an in-house procedure. Two strips of a single layer of film of the composition of the invention, each 1 in.×6 in., were overlapped 1 in. to give a contact surface of 1 sq. in. This contact surface was then subjected to a pressure of 1 psi (a 1-lb. weight was placed on the 1 sq. in. contact surface) for five minutes at ambient temperature. The portions of the strip not in contact were then mounted in the jaws of an Instron Tensile Testing Machine, and the jaws (2.5 in. initial separation) were pulled apart at 10 cm/min. to failure. The force required to separate the lapped area was 810 g/in.$^2$.

EXAMPLE 2

The procedure of Example 1 was repeated, except that 95 parts of an ethylene-vinyl acetate (EVA) copolymer (Cities Service EF 732, containing 4 wt.% vinyl acetate (VA) and having a melt index of 2.75 and a density of 0.928) and 5 parts of POLYPOL 19 were processed to give a cling film. Here, the force required to separate the lapped area was 930 g/in.$^2$.

Referring to U.S. Pat. No. 4,222,913, wherein the viscosities of the EVA and polypropylene copolymers had similar viscosities, the constituents of the instant example have the following viscosities, measured at 500 sec-1 and 380° F.:

EF732—3,200 poises
Polypol 19—0.5 poise
Viscosity ratio—6400
(Ethylene polymer/propylene co-polymer)

EXAMPLES 3–6

The procedure of Example 1 was followed, using the below-described variations and obtaining the noted cling results:

| | EVA Polymer (parts) | VA Content (wt. % in EVA) | Ethylene-Propylene Copolymer (parts) | Cling Results |
|---|---|---|---|---|
| (3) | 96 | 4 | 4 | Comparable to Ex. 2 |
| (4) | 96.5 | 4 | 3.5 | Comparable to Ex. 2 |
| (5) | 97 | 4 | 3 | Comparable to Ex. 2* |
| (6) | 97.5 | 4 | 2.5 | Comparable to Ex. 2* |

*Developed the cling property slowly - required at least 3 days' storage time to develop cling. After this time, cling tests gave results comparable to Example 2.

EXAMPLES 7–9

When the procedure of Example 1 is followed, and the VA content of the EVA component varies as noted below, the cling results are:

| | EVA Polymer (parts) | VA Content (wt. % in EVA) | (EVA properties) | Ethylene-Propylene Copolymer (parts) | Cling Results |
|---|---|---|---|---|---|
| (7) | 95 | 2.5 | MI = 2.0 d. = 0.925 | 5 | Comparable to Ex. 2 |
| (8) | 95 | 7.5 | MI = 0.75 d. = 0.929 | 5 | Comparable to Ex. 2 |
| (9) | 95 | 12 | MI = 0.25 d. = 0.930 | 5 | Comparable to Ex. 2 |

EXAMPLE 10

When the procedure of Example 1 is followed and 95 parts of linear low density polyethylene (LLDPE), having a melt index of 1.0 and a density of 0.920, are mixed with 5 parts of ethylene-propylene copolymer (POLYPOL 19), a mixture similar to that of Ex. 1 is obtained which, due to the higher viscosity of the LLDPE, is extruded at 410° F. The film gives a cling comparable to that of Example 2.

EXAMPLES 11–12

Using the same procedure as Example 2, and using the EVA copolymer of Example 2 but varying the amount of ethylene-propylene copolymer, and by processing at 340° F., due to the lower viscosity, a film having a comparable cling is obtained. However, the use of this composition having higher amounts of the tackifier component leads to tackifier build-up on the processing machinery. The compositions and results of these variations are noted below:

| | EVA Polymer (parts) | VA Content (wt. % in EVA) | Ethylene-Propylene Copolymer (parts) | Cling Results |
|---|---|---|---|---|
| (11) | 92.5 | 4 | 7.5 | Comparable to Ex. 2 |
| (12) | 90.5 | 4 | 9.5 | Comparable to Ex. 2 |

I claim:

1. A composition suitable for a cling/stretch wrap film consisting essentially of:
   a. from about 90 to 97.5 wt.% of an ethylene polymer selected from the group consisting of ethylene-vinyl acetate copolymers having a vinyl acetate content of from about 3 to about 15 wt.%, low density polyethylene homopolymers, and linear low density polyethylene resins, said ethylene polymer having a melt index value from about 0.2 to about 6.0 and b. from about 2.5 to about 10 wt.% of an amorphous low molecular weight ethylene-propylene copolymer, the copolymer having an ethylene content of from about 1 to about 7 wt.%, and wherein the ratio of the viscosity of the ethylene polymer to the viscosity of the ethylene-propylene copolymer varies from about 100 to about 100,000.

2. The composition of claim 1 wherein:
a. the wt.% of the ethylene polymer varies from about 94.5 to about 97,
b. the ethylene-propylene copolymer wt.% varies from about 3 to about 5.5,
c. the low density polyethylene and the linear low density polyethylene homopolymers have melt indices of from about 0.2 to about 6.0 and densities of from about 0.916 to about 0.928, and
d. a minor amount of an antioxidant is added.

3. The composition of claim 2 wherein:
a. the wt.% of the ethylene polymer varies from about 95 to about 96,
b. the ethylene-propylene copolymer wt.% varies from about 4 to about 5,
c. the ethylene-vinyl acetate copolymer has a vinyl acetate content of from about 3.5 to about 8 wt.%,
d. the amount of antioxidant varies from about 100 to about 1000 ppm, based on the finished composition, and
e. the ratio of the ethylene polymer viscosity to the ethylene-propylene copolymer viscosity is from about 100 to about 100,000.

4. The composition of claim 3 wherein:
a. the ethylene-vinyl acetate copolymer has a vinyl acetate content of from about 4 to about 5 wt.%, and
b. the antioxidant is selected from the group consisting of butylated hydroxy toluene and butylated hydroxy ethylbenzene.

5. The cling/stretch wrap film of claim 1 prepared from a composition consisting essentially of about 95–96 parts of an ethylene polymer selected from the group consisting of ethylene-vinyl acetate copolymers having a vinyl acetate content of from about 3 to about 15 wt.%, low density polyethylene homopolymers, and linear low density polyethylene resins, and about 4 to 5 parts of a low molecular weight amorphous ethylene-propylene copolymer of about 3 to 5 wt.% ethylene.

* * * * *